350-404 SR

XR 3,971,928

[redacted]

United Stat

Kirsch et al.

[11] 3,971,928

[45] July 27, 1976

[54] DISPLAY SYSTEM

[76] Inventors: Jordan Kirsch, 78 Huron Ave.; James L. Hamilton, 21 Stearns St., both of Cambridge, Mass. 02138

[22] Filed: Apr. 10, 1974

[21] Appl. No.: 459,660

[52] U.S. Cl. ................................ 240/2.1; 40/130 A; 58/50 R; 350/157

[51] Int. Cl.² ................... F21V 33/00; G01D 11/28; G04B 47/00

[58] Field of Search ............ 240/2.1, 9.5, 2 R, 6.43, 240/8.16; 58/50 R; 350/157; 40/130 A

[56] References Cited

UNITED STATES PATENTS

| | | | |
|---|---|---|---|
| 2,506,134 | 5/1950 | Burchell | 240/9.5 X |
| 2,687,470 | 8/1954 | Weisz | 240/2.1 X |
| 2,744,187 | 5/1956 | Moak | 240/46.59 X |
| 3,116,022 | 12/1963 | Davis | 240/3 |
| 3,473,013 | 10/1969 | Rogers | 240/9.5 |
| 3,694,054 | 9/1972 | Kirsch | 350/157 |

*Primary Examiner*—Joseph F. Peters, Jr.
*Attorney, Agent, or Firm*—Wolf, Greenfield & Sacks

[57] ABSTRACT

An improved color-display system embodied in a clock mechanism wherein the face of the clock constantly changes color. A single light bulb easily accessible at the rear of the clock provides uniform lighting by use of a specially shaped reflector.

8 Claims, 1 Drawing Figure

DISPLAY SYSTEM

FIELD OF THE INVENTION

The present invention relates to a light illuminated display system which may be embodied in a clock mechanism, and in particular to means for improving the source lighting of such a color-display system and access thereto.

BACKGROUND OF THE INVENTION

A number of systems have been devised for constantly changing the color of a display or the like. My earlier patent, U.S. Pat. No. 3,694,054, issued on Sept. 26, 1972, illustrates a color-display system that maximizes the ratio of colored light to white light produced in a single cycle. This result is achieved by placing two birefringent sheets with different retardances between a pair of polarizing sheets whose light transmitting axes are orthogonal to one another, and rotating one of the birefringent sheets. As described in U.S. Pat. No. 3,694,054, that system is illuminated by a plurality of incandescent lamps, equally spaced around a control motor used for rotating one of the birefringent sheets.

That system, while functional for a variety of uses, has several limitations. Among other things, the multiple lamp arrangement produces hot spots, or areas where the light intensity is greater than average, at points in line with the lamps. In addition, should one of the lamps burn out, replacement is complicated by the inaccessible location of the lamp assemblies. Other disadvantages of a string of five, 24-volt bulbs in series are: (1) finding the one burned out bulb is difficult because one may have to try all five locations; (2) the string has an average lifetime which is shorter than the average lifetime of the individual bulbs (i.e., the lifetime for the string is equal to the lifetime of the worst bulb in the string rather than the average bulb); (3) a single, higher wattage bulb is intrinsically more durable than the miniature bulbs one fifth its size.

OBJECTS OF THE INVENTION

Accordingly, it is an object of the present invention to provide an improved light arrangement for a display system that overcomes the limitations referred to above.

It is an object of the present invention to provide an improved means for uniformly illuminating the face of a clock or other display.

A further object of the present invention is to provide a source of light for a changing color display which requires only one ordinary light bulb.

One more object of the present invention is to provide a more rugged, simple, and less expensive clock structure than that taught in U.S. Pat. No. 3,694,054 by improvements which relate to both the mechanical and optical structure of the light display.

A final object of the present invention is to provide a light system that is easily accessible from the back of the color-display to thereby facilitate replacement of a bulb.

SUMMARY OF THE INVENTION

To accomplish the foregoing and other objects of this invention, there is provided a color-display system of the type described in U.S. Pat. No. 3,694,054 with a modified light source and optical system. Multiple, equally spaced lamps are replaced by a single lamp behind the motor. The shadow of the motor is eliminated by means of a combination cylindrical and hemispherical reflector placed around the lamp and motor. The image of the filament within the lamp is diffused by a clear textured diffuser placed between the lamp and motor, and by texturing the spherical reflector. Access to the lamp is by means of a removable back plate held in place by three small magnets. In addition, laminations of a polarizer and retarder form a pair of optical filters which are readily indexed and secured in the housing assembly.

BRIEF DESCRIPTION OF THE DRAWINGS

The foregoing objects and advantages of the present invention will be more clearly understood when considered in conjunction with the accompanying drawing, in which.

DETAILED DESCRIPTION OF THE DRAWINGS

Figure 1:
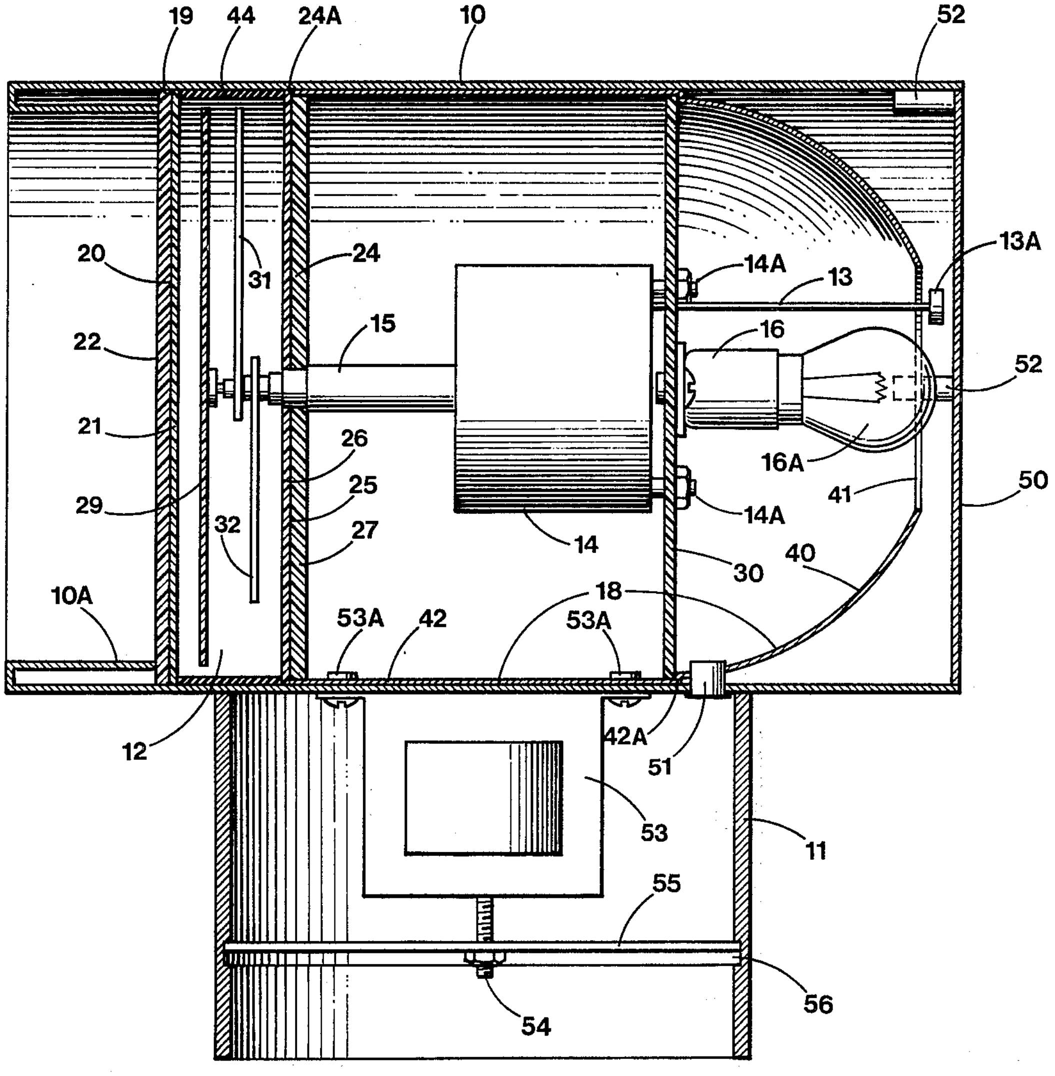
FIG. 1 is a center, cross-sectional view of the clock illustrating the lamp and reflector placement.

FIG. 1 shows a clock housing 10, color-display assembly 12, motor 14, lamp assembly 16, and reflector system 18. The clock housing 10 is cylindrical in shape and is supported by a base 11. The base 11 is also preferably cylindrical in shape and may be secured to the clock housing 10 in any suitable fashion. Both the base 11 and housing 10 are preferably formed of metal. The color display assembly 12 includes a front, one-piece optical filter assembly 19 and a rear one-piece optical filter assembly 24. The front optical filter assembly 19 comprises an integral combination of a polarizer 20 and a retarder 21 which are laminated to the front plastic lens 22. The front optical filter assembly 19 extends across the entire inner surface of housing 10 and is secured at its periphery in a manner hereafter described. The rear optical filter assembly 24 comprises an integral combination of a polarizer 25 and a retarder 26 which are laminated to the translucent plastic diffuser 27. This rear optical filter assembly 24 extends across the entire surface of housing 10 and is secured at its periphery in a manner as hereafter described. The polarizers 20 and 25 have polarizing axes which, in a preferred embodiment, are fixed relative to one another at an angle of 90°. The retarders 21 and 26 have parallel fast axes. These axes are arranged at an angle of 45° with respect to each of the polarizing axes of polarizers 20 and 25. This array may be obtained by making an integral combination of the polarizer 25 and retarder 26 and an identical integral combination of the polarizer 20 and retarder 21. These identical laminates are arranged with the retarder layers 26 and 21 facing each other, which results in crossing polarizing axes and parallel (additive) retarder axes. The retarders 21 and 26 have retardance preferably in the order of magnitude of 280 millimicrons. The total retardance of retarders 21 and 26 equals a wavelength of green light which is in the center of the visible light spectrum. Rotating retarder or birefringent sheet 29, located between and parallel to optical filter assemblies 19 and 24, is circular in shape and extends across almost all of housing 10 and is supported by clock motor shaft 15. The retarder 29 has a small amount of retardance compared with the total retardance of retarders 21 and 26, preferably in the order of magnitude of 140 millimicrons. Minute and hour hands 31 and 32, respectively, are also formed from a birefringent material and are supported by motor shaft 15.

Motor 14 is centered along the axis of housing 10 and supported at its rear on the clear textured diffuser 30. This diffuser 30 may comprise a plastic sheet having at least one surface textured to form a light diffuser. Motor 14 is attached to diffuser 30 by conventional means, such as studs and nuts assembly 14A. The lamp assembly 16 is also centered along the axis of housing 10 and is mounted opposite motor 14 on the rear surface of diffuser 30 with the bulb oriented to the rear of housing 10. Surrounding lamp assembly 16 and motor 14 is reflector system 18 composed of hemispherical portion 40 and cylindrical portion 42 interconnected by an offsetting annular shoulder 42A. The portions 40 and 42 may be fabricated of polished metal or of other heat resistant light reflective material. The hemispherical portion 40 is positioned so that diffuser 30 is secured in shoulder 42A, and its pole is located at the rear of housing 10. At the pole itself, circular cutout 41 provides access to lamp assembly 16, or clock setting knob 13A. In operation, light from the bulb 16A, secured in the socket of lamp assembly 16, is reflected by the hemispherical and cylindrical portions 40 and 42, respectively, so as to eliminate the shadow of motor 14 that one would otherwise expect to encounter. Thus, light from the bulb 16A is reflected by the portions 40 and 42 and converges in front of the motor, thereby eliminating shadow. The image of the filament of the bulb 16A is diffused by textured sheet 30 and by slightly texturing the reflecting surfaces of the reflector system 18. The rear optical filter assembly 24 is seated on the clock shaft sleeve 15 abutting a coaxial bushing. A shoulder 24A on the periphery of the assembly 24 butts against the end of cylindrical portion 42. An annular sleeve 44 spaces the front and rear optical filter assemblies 19 and 24. The forward surface of assembly 19 in turn butts against the annular edge of a reverse fold 10A in the housing 10.

Base 11 is secured to clock housing 10 by suitable means such as a metal bar 55 and a stud and nut assembly 54. The stud is secured into the metal frame of transformer 53, which in turn is mounted by machine screw assemblies 53A through housing 10 to cylindrical reflector 42. The metal bar 55 is engaged or secured in the annular groove 56 in base 11. Tightening the nut on stud 54 draws base 11 tightly into contact with housing 10. The screw assemblies 53A also secure the reflector assembly 18 in housing 10. Connecting wiring from the transformer to the motor and light, passes through the insulating bushing 51.

A removable back 50 provides access to bulb 16A and setting knob 13A. FIG. 1 illustrates back 50 held in position by three small, rod-shaped permanent magnets 52 (one of which is not shown) which are glued or otherwise secured to the inside surface of housing 10. The axes of magnets 52 are all parallel to one another and to the axis of housing 10 with two of the magnets located along a horizontal diameter and the third at the top end of a vertical diameter. To remove back 50, one presses the lower edge, causing back 50 to pivot on the two horizontal magnets 52 and releasing back 50 from the vertical magnet 52. Back 50 can then be pulled from the two horizontal holding magnets 52.

What is claimed is:

1. An assembly including, a housing having opposite ends, a plurality of movable members within the housing, a motor and shaft supporting said movable members and positioned within said housing with said movable members adjacent one end of the housing, a light source within the housing and comprising a single bulb adjacent the other end of said housing, at least one light diffusing sheet extending across the housing intermediate said movable members and said bulb and motor, a reflector system at the other end of said housing partially enclosing said bulb and oriented for reflecting light from said bulb onto said sheet with said light partially converging in front of said motor, said reflector system comprising a partial hemispherical reflective element and a cylindrical member coaxial and adjacent to said reflective element, said motor positioned within said cylindrical member and said bulb positioned within said hemispherical element, and a diffuser intermediate said bulb and motor and extending across the interior of said housing.

2. An assembly as set forth in claim 1, wherein said hemispherical element is provided with an access hole at its axis.

3. An assembly as set forth in claim 1, including a metal cover for said other end containing means for removably securing said cover and said other end containing a plurality of magnets secured to said housing and having ends adapted to magnetically engage said cover.

4. An assembly as set forth in claim 3 wherein all of said magnets are positioned on one side of a common diameter of said housing with two of said magnets on said common diameter whereby said cover can be pivoted about said magnets to remove it from said housing.

5. An assembly as set forth in claim 1 wherein said motor is a clock motor and said moveable members are clock hands.

6. An assembly including, a housing having opposite ends, a plurality of movable members within the housing, a motor and shaft contained in the housing for supporting said movable members at one end of the housing, a light source within the housing and comprising a single bulb at the other end of the housing, at least one light diffusing means extending across the housing intermediate said movable members and said motor, a reflector means within the housing at the other end of the housing partially enclosing and adjacent said bulb and arranged for reflecting light from said bulb onto said diffusing means with said light partially converging in front of said motor, and a second light diffusing means disposed intermediate said bulb and motor and extending across the interior of the housing.

7. An assembly as set forth in claim 6 wherein said reflector means comprises a first reflector at least partially enclosing the bulb and a second reflector at least partially enclosing the motor.

8. An assembly as set forth in claim 7 wherein said first reflector is hemispherical and said second reflector is cylindrical.

* * * * *